United States Patent

[11] 3,523,559

| [72] | Inventor | William H. Gibson |
| | | Sepulveda, Calif. |
| [21] | Appl. No. | 729,960 |
| [22] | Filed | May 17, 1968 |
| [45] | Patented | Aug. 11, 1970 |
| [73] | Assignee | Crane Co. |
| | | a Corp. of Illinois |

[54] FLUID FLOW CONTROL DEVICE
10 Claims, 4 Drawing Figs.

[52] U.S. Cl. ................................................. 138/46,
137/517
[51] Int. Cl. ..................................................... G05d 7/01
[50] Field of Search ........................................... 138/43, 45,
46; 137/517, 525.5

[56] References Cited
UNITED STATES PATENTS
| 2,107,998 | 2/1938 | Rullison | 137/525.5 |
| 2,899,981 | 8/1959 | Binks | 138/46 |

FOREIGN PATENTS
| 783,323 | Great Britain | 137/517 |
| 1,217,791 | France | 137/517 |

*Primary Examiner*— Laverne D. Geiger
*Assistant Examiner*— R. J. Sher
*Attorney*— Lynn H. Latta ABSTRACT: A fluid flow regulator consisting of a body having a port beginning in a seat at an upstream end of the body, and a flexible flow-restricting element in the form of a leaf spring anchored at one end to the seat and cantilevered away from the seat in a bowed curvature which, in operation, is gradually flattened with increasing pressure drop across the port resulting from increased flow with the result that an increasing portion of the length of the spring closes on the seat so as to increasingly restrict the port, thereby providing automatic regulation of flow to a substantially constant rate in a selected operating range.

Patented Aug. 11, 1970 3,523,559
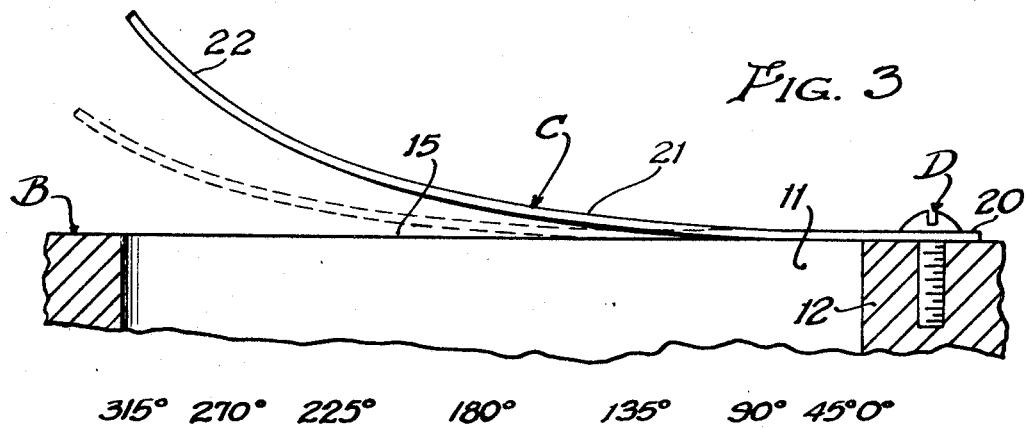
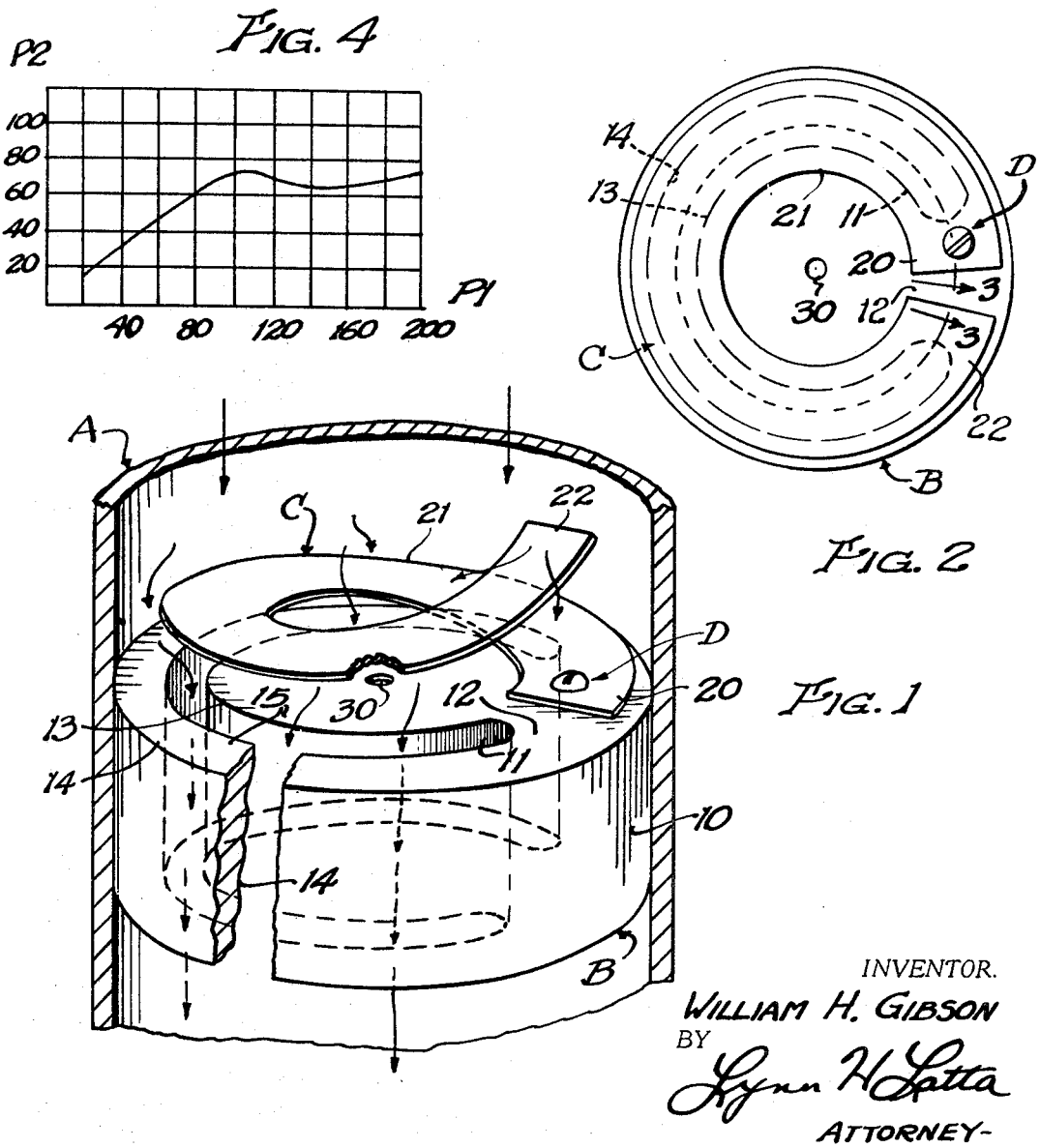
INVENTOR.
WILLIAM H. GIBSON
BY
Lynn H Latta
ATTORNEY

FLUID FLOW CONTROL DEVICE

BACKGROUND OF THE INVENTION

An hydraulic flow regulator utilizing a spring-loaded piston operative to regulate flow through a lateral valve port in a sleeve in which the piston slides, the piston having in its head a restricted orifice across which there is developed a pressure drop which is a function of the flow rate, the piston being slidable in response to the balancing of such pressure drop against the loading of an opposed coil spring, has heretofore been made available to the trade by a number of manufacturers.

For laminar flow, the pressure drop is directly proportional to the flow in most systems and components, the flow is turbulent where the pressure drop is proportional to the square of the flow.

RESUME OF THE INVENTION

The principal object of the invention is to provide a more reliable flow control than has hitherto been available. A specific object is to eliminate potential troubles arising from sliding surfaces, such as jamming or adhesion from contamination or lack of lubrication, with resultant inaccurate and undependable response. Another object is to provide a low-cost, simple flow control for gases or liquids which is dependable during long periods of operation, without requiring repair or adjustment.

To this end, the invention provides a regulator consisting of a body of simple block form having a port of circumferentially extending slot form in a seat consisting of a flat upstream face on the block; and a flow-restricting element consisting of a cantilevered leaf spring of split ring form having one end anchored flatly against the seat and its body lying above the port slot, normally spaced therefrom with an upward inclination, and adapted to be drawn downwardly into closing relation to the port in a seating operation which, in response to increasing pressure differential, is extended progressively along the length of the slot from the anchored end of the spring, resulting in increasing restriction of the port. The spring is curved, with a constantly increasing pitch.

DESCRIPTION

In the drawings:

FIG. 1 is a broken-away perspective view of a flow embodying the invention;

FIG. 2 is a plan view of the control unit;

FIG. 3 is a sectional view of the unit taken as indicated by the line 3--3 of FIG. 2, looking outwardly along the circumference of the flow port which is shown as though spread out into a flat plane; and FIG. 4 is a plotted performance curve for air flowing across the control.

Referring now to the drawing in detail, I have shown therein, as an example of one form in which the invention may be embodied a control unit of cylindrical form, adapted to be installed in a flow conduit A, said control unit consisting generally of a body B and a flexible flow-restricting element C anchored to body B by a fastener element D which can be a screw, rivet or other equivalent fastener means.

Body B can be simply a cylindrical block of suitable rigid material, such as metal or hard plastic, having a cylindrical lateral surface 10 which can be fitted in a flow conduit or casing A where such a simple installation is suitable and having a port 11 of C-shaped circular arcurate slot form, extending from the upstream end to the downstream end of body B, in coaxial relation to the major axis thereof. The circumferential extremities of port 11 are separated by a web 12 which connects the cylindrical central core 13 of the body B to its peripheral collar portion 14. The upstream end of body B has a flat face, normal to its axis which provides a seat 15 bordering the upstream end of port 11.

Flow restricting element C consists of a cantilever leaf spring of C-shape in plan, corresponding to the shape of port 11 but wider, so as to cover the same, radially overlapping the seat 15 at both margins of port 11 and extending beyond both circumferential extremities of the port at its respective ends. For brevity, I prefer to designate it as a "C-beam." Radial cross-sections of the C-beam are parallel to the plane of seat 15, and one end 20 thereof is anchored flatly against the end face of web 12 by means of fastener element D which is anchored in the web 12, as best illustrated in FIG. 3. Extending tangentially from the flat anchored end 20, the C-beam has a cantilevered body portion 21 which curves away from seat 15 with a constantly increasing pitch and continuoulsy curved.

Body B is provided with an axial port 30 which is utilized for adjusting the response of the C-beam. The port 30 bypasses a minor percentage of the flow past the main port 11 when port 11 is wide open, and a larger percentage as the pressure drop increases and the C-beam closes down. Adjustment is varied by varying the diameter of port 30.

As a typical specimen of a C-beam embodying the operating characteristics of the invention, where the body B is approximately ½ inch in diameter, the port may be of .060 inch width, and the C-beam may be of spring metal of .0065 inch thickness.

Air-flow tests on such typical specimen have shown it to have substantially constant flow characteristics within a fairly wide range of upstream pressures (e.g. from about 90 to 200 PSIG, as indicated by substantially constant downstream pressures in the range. This is illustrated by the performance curve of FIG. 4 in which upstream pressures P1 are plotted against downstream pressures P2.

FIG. 4 shows that as upstream pressure builds up (e.g. at start-up of flow) the downstream pressure increases at a substantially constant ratio to upstream pressure rise until an upstream range of pressures from about 90 PSI to 200 PSI is reached, and that within this range only minor fluctuations in downstream pressures will occur, thus achieving substantially constant flow. This wide range of constant-flow operation is more than ample to embrace a normal operating range in most applications.

OPERATIONS

In operation, the C-beam, in unstressed condition, is positioned at maximum height, as approximately illustrated in full lines in FIG. 3 and in FIG. 1, port 11 is substantially unobstructed by the valve element, being open for substantially its entire circumferential extent or length. As fluid is caused to flow through the device as indicated by the arrows in FIG. 1, it will impinge upon and flow around the sides of the C-beam, deflecting it toward seat 15, and a pressure drop or differential will be developed across the port 11 between its upstream and downstream ends. With increasing flow, the pressure differential will increase, and the C-beam will be deflected, as indicated in phantom in FIG. 3, toward seat 15 to an increasing extent. Such deflection will result in progessive seating of the C-beam against seat 15, beginning adjacent its anchored end 20 and proceeding toward free end 22. Such progressive seating will result in correspondingly progressive restriction of flow through port 11. Thus within normal operating limits, substantially constant flow can be attained, each increase in deflection in response to an increase in flow resulting in a corresponding increase in restriction of the port 11, which suppresses the momentary flow increase and restores the flow to the preselected constant rate.

As the flow-restricting element C is progressively seated against seat 15, its cantilever length is correspondingly decreased, and its free end 22 thus becomes increasingly resistant, i.e. decreasingly responsive to pressure differentials in deflection, so that progressively higher pressure differentials are required for further deflecting the valve element toward the seat.

The variable flow-resistance of the spring C at each stage of its deflection is determined by a combination of factors, namely, a) the effective lever-arm length of the unseated portion of the spring, b) the spring-loading in the straightened seated portion of the spring, and c) added bending resistance of the unseated portion. The bending resistance of the spring along its length may be varied in accordance with (a) curvature of the beam, (b) outside and inside radii, (c) beam thickness (d) modulus of elasticity. By suitably relating these factors, the constant flow control can be maintained over a wide range of upstream pressures.

Regulators embodying the invention have been in extended use on aircraft for controlling air flow into a fuel pump where air temperature varies from 400°F to 650°F without presenting any problems.

In volume production, the bypass port, 30 is useful in adjusting the flow control device for uniform performance characteristics, the port being reamed until the specimen demonstrates the desired performance.

I claim:

1. A fluid flow regulator for constant flow control within a predetermined operating range, comprising:
    a regulator body adapted to be mounted in a fluid flow passage, said body having an elongated circumferentially extending flow-control port communicating with an upstream end thereof, said upstream end having a circumferentially extending seat embracing said port; and
    a flow-restricting element consisting of a leaf spring of split ring form cantilever-anchored at one end to said body adjacent an end of said port in covering relation thereto and of continuously curved progressively increasing pitch inclination relative to said seat from said anchored end to a free opposite end thereof,
    said flow-restricting element being responsive to flow through said port so as to be deflected toward and to progressively seat down upon said seat so as to restrict flow through said port increasingly with increasing pressure drop through said port, in a relation such as to effect a substantially constant flow control in said predetermined operating range.

2. A fluid flow regulator as defined in claim 1, wherein said port is of circular C-shape in the plane of said seat, and wherein said flow-restricting element is of helical form.

3. A fluid flow regulator as defined in claim 2, wherein said body is of cylindrical block form.

4. A fluid flow regulator as defined in claim 1, wherein said flow-restricting element is bowed so as to engage said seat progresssively along the length thereof, proceeding from said anchored end toward said free end so as to progressively close said port along its length.

5. A fluid flow regulator as defined in claim 1, wherein said regulator body has an adjustment port bypassing said flow-control port, for regulating the operation of said flow-restricting element.

6. A fluid flow regulator as defined in Claim 1, wherein said port is of circular C-shape in the plane of said upstream end of said body, and wherein said flow-restricting element is of helical form, said regulator body having an axially disposed adjustment port bypassing said flow-control port, for regulating the operation of said flow-restricting element.

7. A flow regulator as defined in claim 1, wherein said flow-restricting element has an area so related to the area of said port as to effect substantially complete covering relation thereto in a position of minimum flow.

8. A fluid flow regulator as defined in claim 1, wherein said regulator body has an adjustment port bypassing said flow-control port, for regulating the operation of said flow-restricting element;
    and said element has an area so related to the area of said port as to establish full covering relation thereto in a fully seated position.

9. A flow regulator as defined in claim 1, wherein said flow-restricting element is of gradually increasing curvature from its anchored end toward its free end.

10. A flow regulator as defined in claim 1, wherein said flow-restricting element has a port-covering area several times as long as it is wide.